Patented Sept. 19, 1933

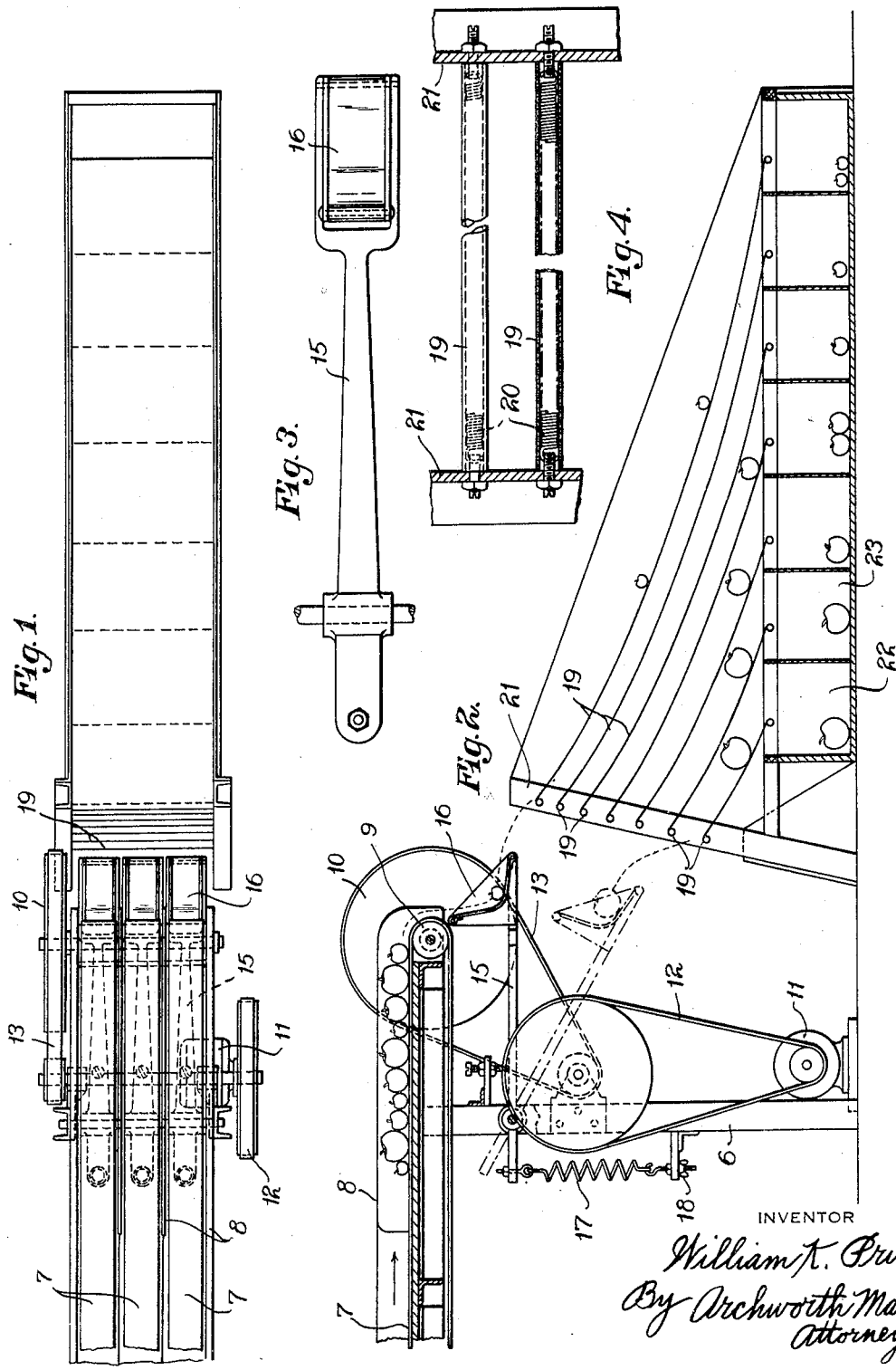

1,927,217

UNITED STATES PATENT OFFICE 1,927,217

FRUIT SIZING APPARATUS

William K. Price, Selah, Wash.

Application March 5, 1931. Serial No. 520,217

6 Claims. (Cl. 209—121)

My invention relates to sizing machines, and is particularly suitable for the grading of fruits, vegetables and the like, according to weight, but may, of course, be employed in connection with the sorting of various other articles.

One object of my invention is to provide apparatus of simplified and improved form for separating articles according to weight.

Another object of my invention is to provide an apparatus of the character referred to which will grade fruit according to weight, without bruising or otherwise injuring the same.

A further object of my invention is to provide apparatus which will accurately grade articles of a wide range of sizes, and which will operate more rapidly in the separation of the smaller sizes than in the case of the larger sized articles.

Still another object of my invention is to provide apparatus that may be readily adjusted to grade various fruits, vegetables and the like, of a wide range of sizes and shapes.

One form which my invention may take is shown in the accompanying drawing wherein Figure 1 is a plan view of an installation embodying my invention; Fig. 2 is a view thereof, partly in side elevation and partly in section; Fig. 3 is a plan view, on an enlarged scale, of one of the scale beam and deflector members of Fig. 1, and Fig. 4 is a view, on an enlarged scale, showing the manner in which the ends of the chutes of Fig. 2 are supported.

While the drawing shows the invention as employed for separating apples, according to weight, it will be understood that it may also be employed in the grading of peaches, pears, potatoes, etc.

The apparatus comprises a series of conveyer belts that discharge the articles, one-by-one, at the forward end of the conveyer, a deflector member mounted on a scale arm, and a series of chutes or trough-like members and bins into which the various sizes of fruit are directed. The bins or other receptacles may be in the form of boxes, crates, or bags.

The conveyer frame 6 supports conveyer belts 7 each of which is disposed within or beneath a trough 8 that will cause the fruit to be carried in single file by each belt. The belts pass around a shaft or drum 9, that carries a pulley 10 which is driven by a motor 11, through belts 12 and 13 that pass around suitable pulleys. The belts 7 are driven quite slowly so that an appreciable time interval elapses between the discharge of one apple from the forward end of the conveyer and the discharge of the next succeeding apple therefrom.

An arm 15 that functions as a scale beam is pivotally mounted beneath each conveyer belt 7 and carries a deflecting member 16 of cup-like form and which may be of canvas or other suitable material to avoid bruising of the fruit when the fruit is discharged into the deflector. The beam 15 is yieldably maintained in its horizontal position as shown in Fig. 2, by a spring 17 whose one end is connected to the rear end of the beam, and whose other end is anchored to the framework.

The spring is so calibrated that it will be stretched a certain distance through tilting of the beam 15 by an apple falling into the deflector 16. It is not necessary that the spring be weak enough to permit deflection of the beam 15 when articles of very light weight fall upon the deflector 16, but for all articles in excess of a given weight, the beam will be deflected to an extent proportionate to the weight of the article. The spring may be adjusted by a thumb nut 18 to adapt the device to different classes of articles. For example, some varieties of potatoes are much heavier than peaches and apples, so that the tension of the spring should be increased in order to adapt the device to these heavier articles.

When the fruit falls against the deflector 16, it will be deflected to one of the chutes or catchers 19 that may be of canvas or the like to avoid bruising of the fruit. The receiving ends of these chutes 19 are supported upon coil springs 20, that are connected to uprights 21, forming part of the framework of the catching device, so that if a piece of fruit is not directed through a path directly in line with one of the chutes but against the end of a chute, the spring 20 will yield to permit the fruit to fall into the chute directly beneath such spring, thus avoiding bruising of the fruit and preventing it from rebounding and falling to the ground. To facilitate entry of the fruit into the chutes, the frame members 21 are inclined, so as to bring the entrances to the chutes more nearly into line with the trajectory path of the fruit as it passes from the deflector 16.

The largest sizes of fruit will, of course, deflect the beam 15 to approximately the position indicated by dotted lines in Fig. 2, and they will enter a receptacle or bin 22, the next larger size will enter the receptacle 23, etc. Grading in sizes may be such that 100 pieces of fruit, for example, will fill the receptacle 22, a slightly larger number be required to fill the receptacle 23, etc. Small sizes of fruit will be discharged from the conveyer in more rapid succession than the larger sizes, by reason of the fact that a greater number occupy a given lineal space on the conveyor belt than in the case of the larger sizes, but since the beam 15 will not be deflected to a very great extent by the smaller sizes, such beam will complete its cycles of movement more quickly than when it is deflected further by the heavier fruit. The movements of the beam are thus automatically synchronized with relation to the rate at which various sizes of fruit are discharged by the conveyer.

The deflector 16 can, of course, be adjusted longitudinally of the beam 15 to adapt the device to a wide range of sizes of articles and the spring 17 can be adjusted without interfering with the movement of the beam 15 and without stopping sizing operations.

I claim as my invention:—

1. Sizing apparatus comprising means for discharging articles for free falling movement, a downwardly yieldable deflector member positioned in the line of descent of the articles and disposed in angular relation relative thereto, whereby the articles are trajected from said member in paths dependent upon the weight of the articles, and means positioned in the trajectory paths of the article for receiving the same.

2. In a sizing machine, the combination with a conveyer device arranged to drop articles therefrom, of a deflector member positioned beneath the conveyer, said member having a yieldably supported and flexible receiving surface disposed in angular relation to the line of descent of the articles, whereby the articles are impelled from said surface in trajectory paths dependent upon the weight of the articles, and means for receiving the trajected articles.

3. In a sizing machine, the combination with a conveyer arranged to drop articles therefrom, of a deflector member yieldably supported beneath the conveyer and having an inclined flexible receiving surface positioned across the line of descent of the articles, whereby the articles are impelled from said surface in trajectory paths dependent upon the extent the deflector is moved by the weight of an article, and means for receiving the trajected articles.

4. Sizing apparatus comprising a conveyer movable to discharge articles one by one and cause free falling movement thereof, a beam pivotally mounted beneath the conveyer and having a deflector portion positioned in the path of descent of the articles, and means for yieldably supporting the beam in horizontal position, the rate of movement of the conveyer being such that the elapsed time between discharge of successive articles is at least equal to that required for the beam to be moved to deflected position and back to horizontal position.

5. Sizing apparatus comprising a conveyer movable to discharge articles one by one and cause free falling movement thereof, a beam pivotally mounted beneath the conveyer and having an inclined deflector portion positioned in the path of descent of the articles, and means for yieldably supporting the beam in horizontal position, the rate of movement of the conveyer being such that the elapsed time between discharge of successive articles is at least equal to that required for the beam to be moved to deflected position and back to horizontal position.

6. Sizing apparatus comprising a conveyer movable to discharge articles one by one and cause free falling movement thereof, a beam pivotally mounted beneath the conveyer and having a deflector portion positioned in the path of descent of the articles, and means for yieldably supporting the beam in horizontal position, a plurality of receiving devices having entrances disposed along an inclined line which is approximately tangential to the path of movement of the deflector portion, the rate of movement of the conveyer being such that the elapsed time between discharge of successive articles is at least equal to that required for the beam to be moved to deflected position and back to horizontal position.

WILLIAM K. PRICE.